UNITED STATES PATENT OFFICE.

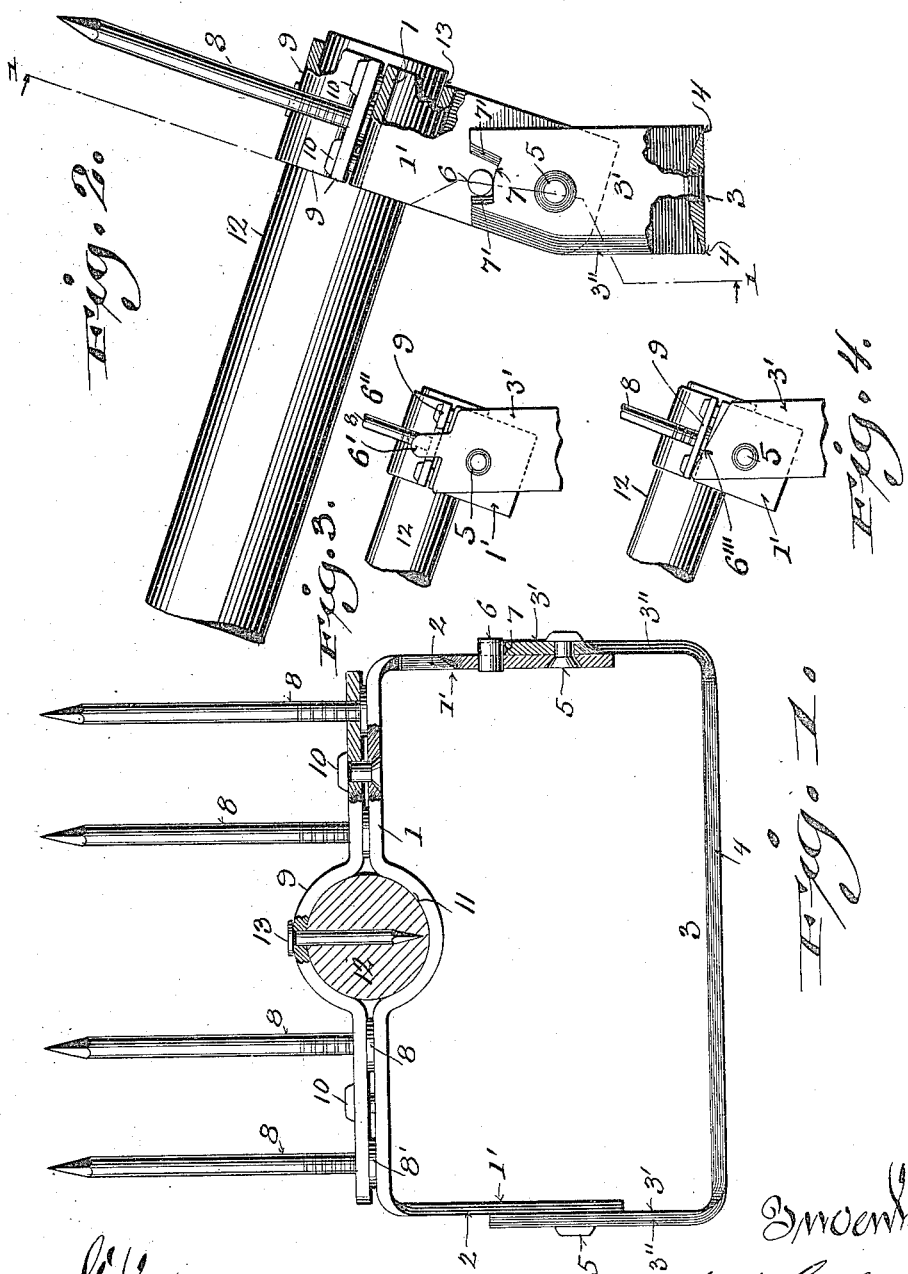

JOHN GILSON, SR., OF PORT WASHINGTON, WISCONSIN.

GARDEN-TOOL.

1,167,491.

Specification of Letters Patent. Patented Jan. 11, 1916.

Application filed February 16, 1915. Serial No. 8,514.

*To all whom it may concern:*

Be it known that I, JOHN GILSON, Sr., a citizen of the United States, and resident of Port Washington, in the county of Ozaukee and State of Wisconsin, have invented certain new and useful Improvements in Garden-Tools; and I do hereby declare that the following is a full, clear, and exact description thereof.

My invention has for its object to provide a simple, economical and handy combination garden tool especially adapted for weeding purposes, one of the novel features being the provision whereby the cutting blade is arranged to oscillate with respect to the skeleton shank bail of the tool to present the proper angle in order that the blade will enter the soil readily.

Another object of my invention is to provide the oscillatory blade with a double cutting edge, whereby it may be pushed or pulled as the case may require. Thus in a pushing operation the tool can be manipulated closely about the stalk or roots of the plant.

Still another object of my invention is to provide a clip in connection with the bail shank for the support of rake teeth.

A further object of my invention is to provide the shank bail with downturned legs having cutting edges which operate in conjunction with the upturned legs of the cutting bail, edges of which are sharpened to constitute cutting members.

With the above and other minor objects in view the invention consists in certain peculiarities of construction and combination of parts as set forth hereinafter with reference to the accompanying drawings and subsequently claimed.

In the drawings Figure 1 represents an end elevation of a tool embodying the features of my invention with parts broken away and in section, as indicated by line 1—1 of Fig. 2; Fig. 2, a side elevation of the same with parts broken away and in section to more clearly illustrate certain details of construction, and Figs. 3 and 4, detail views showing modified forms of bail stop mechanism.

Referring by characters to the drawings, 1 represents the bridge piece of a shank bail having downturned legs 1', which legs, as shown, may be formed with beveled cutting edges 2. The shank bail is adapted to receive a cutting bail 3 having upturned legs 3', which legs are, as shown, formed with cutting edges 3''. The horizontal stretch of the bail constitutes a blade having two cutting edges 4, whereby the tool, when manipulated in either direction, will lift the soil or sever any weeds which may be disposed about the plant that is cultivated.

The upturned legs of the cutting bail are pivotally connected to the downturned legs 1' of the bridge bail by studs or rivets 5. Oscillatory movement of the cutting bail is limited by a pin 6, which pin extends from the face of one of the downturned legs of the bridge bail, as best shown in Fig. 2. The pin 6 is positioned to enter a notched recess 7 that is formed in an upwardly projecting ear extension of the juxtaposed cutting bail leg 3 and the side walls 7' of this notched recess are, as shown, positioned radially with relation to the fulcrum point of the cutting bail and are also beveled to serve as scrapers for the adjacent face of the bridge bail leg 2, whereby accumulated soil about the stop pin is automatically cleared incidental to vibratory movement of the cutting bail. It will be observed that the space between the radial side walls 7' of the notch 7 is of sufficient width to permit slight oscillatory play of the cutting bail upon its pivot points.

In order to increase the utility of the tool without materially increasing the cost of manufacture, I provide rake teeth 8, which rake teeth are preferably formed from standard wire nails. The heads 8' of the nails forming the rake teeth are seated against the upper surface of the bridge piece 1 and a strap 9 provided with a series of apertures is slipped over the pointed ends of the nails to engage the under faces of the nail heads, whereby said nail heads are clamped in connection with the bridge piece 1. The strap 9 is thereafter secured to the bridge piece 1 by rivets 10, as shown. Thus the bridge piece and strap are securely clamped together and rigidly confine the wire nails which project in the opposite direction from that of the cutting bail and together form a convenient rake. The central portion of the bridge piece 1 and the strap 9 are formed with semicircular loops which together constitute a socket 11 for the reception of a tool handle 12, the same being secured within the socket by a nail 13 or other suitable means.

From the foregoing description it is obvious that a convenient combination garden tool is formed comprising a rake and a cutting blade which is utilized to sever weeds or loosen the earth about a plant, the tool being capable of effective manipulation back and forth and, when so manipulated, the cutting bail will tilt slightly in either direction upon its fulcrum points to present a proper angle for cutting with relation to the direction of travel. The cutting bail and downturned legs of the shank bail may, as shown, also be formed with cutting edges, whereby weeds or other rank growth can be readily severed and removed from about the stalk of a cultivated plant.

Referring to Fig. 3, the upturned legs 3' of the bail 3 which are pivoted to the downturned legs 1' of the bridge-piece are provided with fingers 6', which fingers project into the recesses 6'' that are formed in the ends of the straps 9, whereby movement of the bail is limited in either direction.

Fig. 4 shows still another form of bail stop wherein the free end of the upturned leg 3' is terminated to form an oblique shoe 6''', which shoe is adapted to abut the lower face of the projecting bridge-piece 9, whereby movement of the cutting bail is limited.

I claim:

1. A garden tool comprising a socketed bridge piece having downturned legs provided with front and rear cutting edges, a two edge cutting blade having upturned legs provided with front and rear cutting edges and in pivotal union with the bridge piece legs, and means for limiting oscillatory movement of the cutting blade.

2. A garden tool comprising a bridge piece having downturned legs, said legs being provided with outwardly projecting stops, and a cutting blade having upstanding legs pivoted to the legs of the bridge piece, and provided with notches—having inwardly beveled side edges—and into which the stops project.

In testimony that I claim the foregoing I have hereunto set my hand at Milwaukee, in the county of Milwaukee and State of Wisconsin, in the presence of two witnesses.

JOHN GILSON, Sr.

Witnesses:
Geo. W. Young,
M. E. Downey.

Copies of this patent may be obtained for five cents each, by addressing the "Commissioner of Patents, Washington, D. C."